May 16, 1961  C. S. TUDELA  2,983,957
MOLDING MACHINE DIE LOCATING MEANS AND METHOD
Filed Sept. 2, 1958  2 Sheets-Sheet 1

INVENTOR:
Charles Stone Tudela,
Bair, Freeman & Molinare
BY
ATTORNEYS.

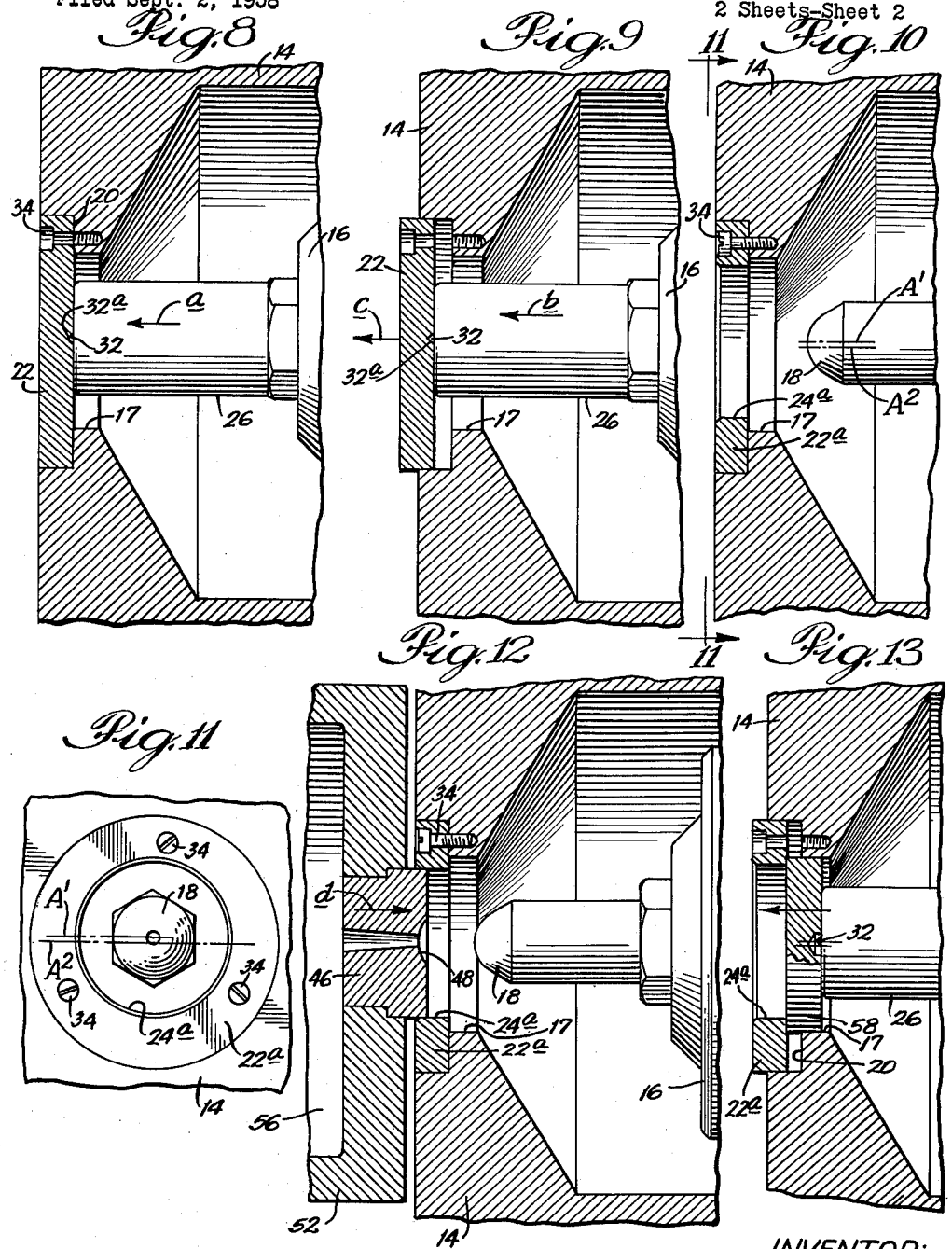

2,983,957

MOLDING MACHINE DIE LOCATING MEANS AND METHOD

Charles S. Tudela, Richmond, Ind., assignor to National Automatic Tool Company, Inc., Richmond, Ind., a corporation of Indiana Filed Sept. 2, 1958, Ser. No. 758,195

7 Claims. (Cl. 18—30)

This invention relates to injection molding machines in general and more particularly to a device and method for accurately locating a molding die and its sprue bushing in relation to the injection nozzle of the machine.

One object of my invention is to provide novel means for locating a die with respect to the die head of an injection molding machine and in properly aligned relation to the injection nozzle thereof, and to the method involved in effecting such locating of said die relative to said injection nozzle.

Heretofore, the mounting of an injection molding die on a die head with accuracy of mating between the sprue bushing and the injection nozzle has been difficult and fraught with inaccuracies by reason of the injection nozzle off center relative to the socket of the sprue bushing being the rule rather than the exception due to manufacturing tolerances and other factors during the assembly of the injection unit and the die head on an injection molding machine base. In the greater percentage of cases, after the machine has been installed on the customer's foundation, it is found that the nozzle opening of the die head is not concentric with the nozzle due to mis-alignment caused by shipping, rigging or foundation.

When the injection nozzle is off center relative to the sprue bushing socket there is not proper mating between the socket and the nose of the injection nozzle during the injection molding operation and leakage occurs which cannot be tolerated. My present invention contemplates the provision of a die locating plate or blank and a means to center-punch mark it in relation to an injection nozzle so as to be able thereafter to accurately machine a bore in the blank to make of it a die locating ring attached to the die head and having its bore in accurate relationship to the injection nozzle for receiving the sprue bushing of a molding die with assurance that the socket of the sprue bushing will properly coact with the nose of the injection nozzle.

Another object is to provide means which can be fitted to an injection molding machine at the nozzle end of the injection unit so that when brought into contact with a plate-like blank fitted to the die head, it so marks this plate as to make it possible to later machine the plate so that it will have an inside diameter or bore truly coaxial with the central axis of the injection nozzle so that a die may be located with its sprue bushing fitting such inside diameter or bore so as to accurately locate the die on the die head before it is secured thereto, and with assurance that any sprue bushing will thereafter mate properly with the injection nozzle while securing a die to the die head and subsequently during injection operations.

Still another object is to provide a die locating plate which serves as a blank from which to form a die locating ring and which is tightly fitted initially into a counterbore of the die head of the injection molding machine, and thereafter accurately center-punched in relation to the injection nozzle so that the die locating blank can then be chucked in a lathe and a bore machined therein concentric to the center punch mark, so that such bore then constitutes a die locating bore and the plate a die locating ring for coaction with a sprue bushing of a die with assured accuracy of positioning the die in relation to the die head before it is secured thereto.

A further object is to provide a method of procedure for fitting a die to a die head into which an injection nozzle extends, comprising the steps of securing a tight fitting die locating plate in a counterbore of the die head; drawing it thereinto by means of screws or the like; removing the screws; providing the injection unit with a combination center punch-ejector device either in, over or in place of the injection nozzle; moving the injection unit and the die head relatively toward each other slowly for center-punching the die locating blank; then ejecting the blank from the counterbore of the die head and machining a bore through the die locating blank concentric with the center punch mark to make of it a die locating ring whereupon the center punch-ejector device may be removed from the injection unit and a die with its sprue bushing may be fitted to the die head with the sprue bushing projecting into the bore of the die locating ring, thereby accurately locating the die on the die head whereupon it may be secured thereto.

With these and other objects in view, my invention consists in the construction, arrangement and combination of the various parts of my die locating means and the method of procedure for fitting the same to a die head, whereby the objects above contemplated are attained, as hereinafter more fully set forth, pointed out in my claims and illustrated in detail on the accompanying drawings, wherein:

Fig. 8 is a view similar to Fig. 2 with the screws removed and the injection unit and die head being moved relatively toward each other for center-punch marking the die locating blank during one step of the method;

Fig. 9 is a similar sectional view showing the die locating blank being pushed out by the center punch-ejector device;

Fig. 10 is a similar view showing the die locating ring re-installed in place in the counterbore of the die head after the die locating blank has been machined into a die locating ring, and showing center punch-ejector device removed so that the injection nozzle may be used for injection molding operations;

Fig. 11 is a view similar to Fig. 5 as taken on the line 11—11 of Fig. 10 and shows the die locating ring as distinguished from the die locating blank of Fig. 5;

Figure 1:
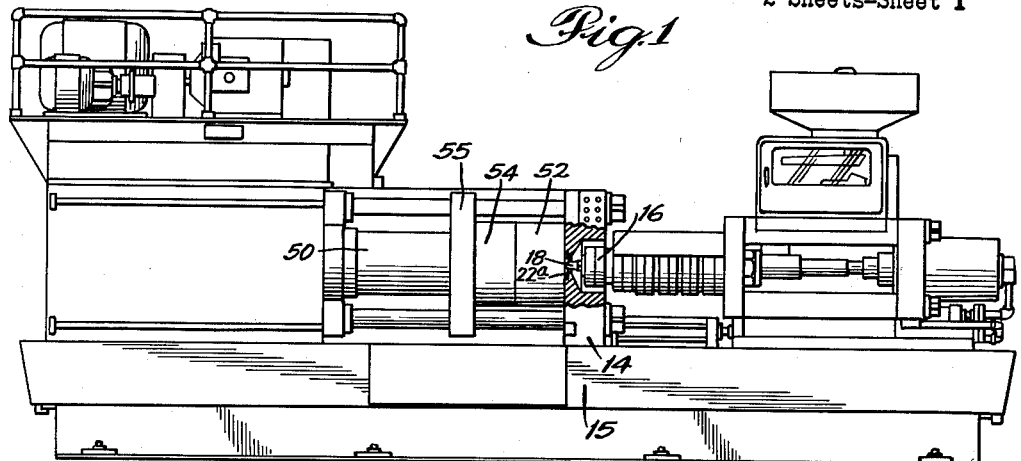
Fig. 1 is a side elevation of an injection molding machine including my die locating ring and a molding die positioned thereby.

Fig. 12 is a sectional view similar to Fig. 10 except showing the die and its sprue bushing being mounted on the die head with the sprue bushing interfitting with the bore of the die locating ring for thus locating the sprue bushing relative to the nozzle and the die relative to the die head; and Fig. 13 is a view similar to Fig. 9 showing a method of removal of the die locating ring when it is to be replaced by another one.

On the accompanying drawings I have used the reference numeral 15 to indicate the base of an injection molding machine and 14 a die head thereof. The die head 14 has the usual nozzle opening 17. The usual hydraulic injection unit is shown at 16 terminating in an injection nozzle 18 for injecting heat-softened plastic material into a molding die comprising a stationary mold half 52 and a movable mold half 54. The die head 14 is provided with a counterbore 20.

Figures 2, 3, 4, 5:
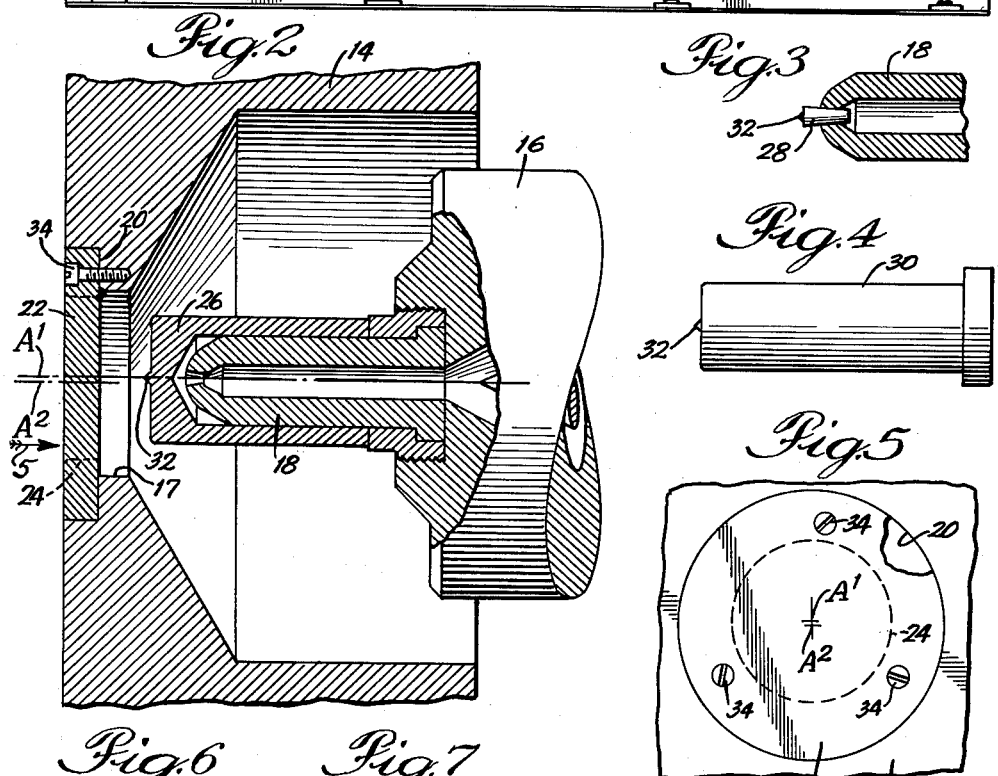
Fig. 2 is an enlarged sectional view showing the die locating plate in place on the die head and one form of center punch-ejector device on the injection nozzle for operating or marking the same.
Figs. 3 and 4 show modified forms of center punch-ejector devices.
Fig. 5 is a front view of the die head and the die locating plate of Fig. 2 as indicated by the arrow 5 adjacent Fig. 2.

In Figs. 2, 5, 6, 7, 8 and 9 I show a plate or disc-like die locating blank 22 having its periphery formed on a radius from center $A^2$. Indicated on the blank 22 by dotted lines in Figs. 2 and 5 is a die locating diameter 24 on a radius from center $A^1$ which is the axis of the injection nozzle 18. In Fig. 2 I show a center punch-ejector device 26 in the form of a cap over the injection nozzle 18 and terminating in a center punch point 32. The point 32 is concentric with the bore of the device 26 and such bore snugly fits over the injection nozzle 18 whereby the point 32 is likewise concentric with the axis $A^1$. In Figs. 3 and 4 I show modifications of the center punch-ejector device indicated 28 and 30 respectively, 28 being a tapered plug provided with the center punch point 32 and 30 being a replacement plug likewise provided with a center punch point 32 and adapted to replace the nozzle 18. Figs. 3 and 4 illustrate possible modifications of Fig. 2 to secure the same results as will become apparent after the operation of my invention and the procedure method involved are described.

The die locating blank 22 is held in position in the counterbore 20 of the die head 14 by means of three cap screws 34. One of the cap screws may be located off the 120° radii for "fool-proof" distribution of the cap screws 34, or a locating pin 36 may be used as in Fig. 6, or indicating marks may be made such as center-punch marks 38 and 40 as in Fig. 7 to insure replacement of the blank 22 (after it is machined into a ring 22ª as will hereinafter be described) in properly oriented position.

The periphery of the die locating blank 22 is preferably a force fit in the counterbore 20, thus relieving any securing screws 34 (or dowels if used) of all shear stresses. This consequently adds greatly to the physical strength of the arrangement.

The procedure for practicing my method consists of the following steps:

(1) (Fig. 2) The blank 22 is drawn into the counterbore 20 of the die head 14 by the screws 34 until it is tightly seated against the bottom face of the counterbore.

(2) (Fig. 8) The screws 34 are then removed.

(3) The center punch-ejector device 26 (Fig. 2), 28 (Fig. 3) or 30 (Fig. 4) is mounted on, or in, or in place of the nozzle 18.

(4) (Fig. 8) The injection unit 16 is operated so as to move forward slowly (arrow a), thus bringing the center-punch point 32 into contact with the blank 22 for center-punch marking it as at 32ª.

(5) (Fig. 9) The injection unit is further advanced (arrow b) for forcibly pushing the blank 22 out of the counterbore (arrow c). With further reference to 4 and 5, some molding machines move the die head toward the injection nozzle, but in either that case or the one illustrated on my drawings there is movement of the two relatively toward each other.

(6) The blank 22 is now chucked in a lathe to rotate about the center punch mark 32ª (axis $A^1$) as a center so that the disc can be machined out on the diameter 24 to provide a bore 24ª. This is readily accomplished by holding the blank against the face of an independent jaw chuck by means of the tail stock dead center of the lathe and then tightening the chuck jaws whereupon the bore 24ª may be machined. The blank then constitutes a die locating ring 22ª as shown in Figs. 10, 11, 12 and 13.

(7) (Fig. 10) The screws 34 are reinserted and the device 26 removed, whereupon the machine is ready for injection molding operations.

(8) (Fig. 12) The stationary mold half 52 is then located against the face of the die head 14 by reason of its sprue bushing 46 entering the bore 24ª (arrow d).

The bore 24ª is preferably a snug fit in relation to the sprue bushing 46. The sprue bushing has the usual socket 48 for sealing against the nozzle 18 and the movable mold half 54 is brought into engagement with the mold half 52 by the usual die closing ram 50 and its platen 55 during the injection molding operation as illustrated in Fig. 1. As shown in Fig. 12 the sprue bushing 46 now acts as a locating means cooperating with the bore 24ª as the mold half or die 52 is moved into position against the face of the die head 14 after which the die 52 is secured to the die head 14 by means (not shown), usually by suitable clamps in clamping slots in the mold half and cap screws threaded into the die head. The mold cavity is designated 56 in Fig. 12.

Figures 6, 7:
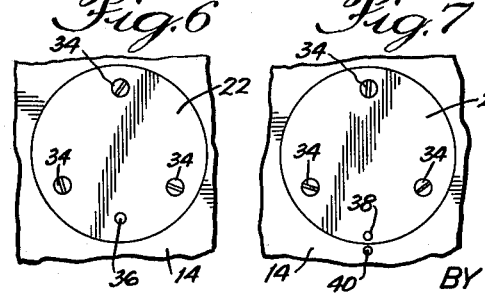
Figs. 6 and 7 are modifications of Fig. 5 showing methods of insuring reassembly of the die locating ring in the proper relation to the die head after the center-punch marking and machining or bore forming operations.

Once the die locating ring 22ª is mounted, all subsequent dies may be accurately located with relation to the injection nozzle 18 providing of course they use the same sprue bushing 46 or one that has the same diameter as the bore 24ª. Correct rotational re-positioning of the die locating ring 22ª in Fig. 12 may be insured by fool-proof distribution of the securing screws, a locating pin, dowels or other means as illustrated in Figs. 5, 6 and 7.

By placing a suitable disc 58 behind the die locating ring (see Fig. 13) this device may also be used at any later time as a convenient speedy means of ejecting the die locating ring from the die head for repair or renewal with no danger of damaging the nozzle 18. This ejection is accomplished by operating the injection unit slowly as in step (5).

It will be obvious from the foregoing specification that I have provided a simple yet accurate means for insuring the proper coaxial alignment of a sprue bushing of a molding die with an injection nozzle, whether the nozzle is on center relative to a bore of the die head or off center relative thereto. The method involved insures proper marking of a die locating blank in such manner that it can be subsequently machined into a die locating ring having a bore to fit the sprue bushing of the molding die which sprue bushing is then accurately centered in relation to the axis of the injection nozzle. It will be obvious, too, that I have provided a means and method for correcting any possible mis-alignment of injection nozzle and die, however slight, caused by shipping, rigging, faulty foundation or other causes.

Some changes may be made in the construction and arrangement of the parts of my die head locating means and the method disclosed may be departed from to some extent without departing from the real spirit and purpose of my invention, and it is my intention to cover by my claims any modified forms of structure use of mechanical equivalents or use of equivalent method steps which may reasonably be included within their scope.

I claim as my invention:

1. An injection molding machine comprising a die head, an injection unit and an injection nozzle, said die head having an opening therein into which said injection nozzle is adapted to extend and a counterbore concentric relative to said opening, said opening being eccentric relative to said injection nozzle, die locating means comprising a die locating element received in said counterbore, the periphery of said die locating element and the circumferential wall of said counterbore being substantially equal, the periphery of said die locating element being thereby also concentric relative to said opening and said die locating element being confined against movement relative to said die head in a plane normal to the axis of said die head opening and said injection nozzle, said die locating element having a bore therethrough concentric relative to said nozzle for receiving the sprue bushing of a molding die secured to said die head, the sprue bushing being thereby accurately located coaxial with said injection nozzle.

2. An injection molding machine comprising a die head, an injection unit and an injection nozzle, said die head having an opening therein into which said injection nozzle is adapted to extend and a counterbore concentric relative to said opening, said opening being eccentric relative to said injection nozzle, die locating means comprising a die locating element having a periphery substantially the same size as said counterbore, screws passing through said element and threaded into said die head for securing said element to said die head in a predetermined rotational relation thereto and with its periphery concentric relative to said opening, said die locating element being thereby held solely by said counterbore against any shifting in a plane normal to the axis of the molding machine and having a bore therethrough concentric relative to said nozzle for receiving the sprue bushing of a molding die secured to said die head, the sprue bushing being thereby accurately located coaxial with said injection nozzle.

3. The method of locating a molding die with respect to a die head of an injection molding machine and in accurate coaxial alignment with the injection nozzle thereof comprising the steps of securing a die locating blank in a predetermined relation to the die head, associating a center punch device with the injection unit of the molding machine, moving the injection unit and die head relatively toward each other for causing said device to center punch mark said blank, machining a bore in said blank concentric with said center punch mark thereby providing a die locating ring, and securing said ring in said predetermined relation to the die head for reception of a portion of a molding die which is then in coaxial alignment with the injection nozzle.

4. The method of locating a molding die with respect to a die head of an injection molding machine and in accurately aligned relation to the injection nozzle thereof comprising rotationally orienting a die locating blank in a counterbore of the die head, associating a center punch-ejector device with the injection unit of the molding machine, moving the injection unit and die head relatively toward each other, for causing said device to center punch mark said blank and eject the same from the counterbore, machining a bore in said blank concentric with said center punch mark thereby providing a die locating ring, re-securing said ring in the same rotationally oriented position in the counterbore for reception of the sprue bushing of a molding die in said bore in coaxial alignment with the injection nozzle, the sprue bushing thereby locating the molding die relative to the die head for securement of the die to the head.

5. The method of locating a molding die with respect to a die head of an injection molding machine and in accurately aligned relation to the injection nozzle thereof comprising rotationally orienting a die locating blank on the die head, associating a center punch device with the injection unit of the molding machine, moving the injection unit and die head relatively toward each other, for causing said device to center punch mark said blank, machining a bore in said blank concentric with said center punch mark, thereby providing a die locating ring, and securing said ring in the same rotationally oriented position on the head for reception of the sprue bushing of a molding die in said bore in coaxial alignment with the injection nozzle.

6. The method of locating a molding die with respect to a die head of an injection molding machine and in accurately aligned relation to the injection nozzle thereof comprising rotationally orienting a tight-fitting die locating blank in a counterbore of the die head, inserting screws through said blank and threading them into the die head to draw said blank into the counterbore, removing said screws, associating a center punch-ejector device with the injection unit of the molding machine, moving the injection unit and die head relatively toward each other, for causing said device to center punch mark said blank and eject the same from the counterbore, machining a bore in said blank concentric with said center punch mark, thereby providing a die locating ring, reinserting said screws through said die locating ring and into the die head for reception of the sprue bushing of a molding die in said bore in coaxial alignment with the injection nozzle, the sprue bushing thereby locating the molding die relative to the die head for securement of the die to the head.

7. The method of locating a molding die with respect to a die head of an injection molding machine and in accurate coaxial alignment with the injection nozzle thereof comprising the steps of forcing a die locating blank into a counterbore of a die head and in a predetermined relation thereto, associating a center punch-ejector device with the injection unit of the molding machine, moving the injection unit and die head relatively toward each other, for causing said device to center punch mark said blank and eject the same from the counterbore of the die head, machining a bore in said blank concentric with said center punch mark, thereby providing a die locating ring, and securing said ring under force in said counterbore and in said predetermined relation to said die head for reception of the sprue bushing of a molding die and thereby coaxial alignment of its socket with the injection nozzle.

References Cited in the file of this patent

UNITED STATES PATENTS

| | | |
|---|---|---|
| 2,775,812 | Mohr | Jan. 1, 1957 |
| 2,821,750 | Huelskamp | Feb. 4, 1958 |
| 2,864,158 | Hake | Dec. 16, 1958 |